United States Patent
Likhomanov et al.

(10) Patent No.: US 11,575,514 B2
(45) Date of Patent: Feb. 7, 2023

(54) ELECTRONIC DEVICE AND METHOD OF CONTROLLING THE SAME

(71) Applicant: Samsung Electronics Co., Ltd., Suwon-si (KR)

(72) Inventors: Dmytro Likhomanov, Kharkov (UA); Oleksandr Shchur, Kyiv (UA); Andriy Oliynyk, Kyiv (UA); Dmytro Progonov, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 289 days.

(21) Appl. No.: 16/985,401

(22) Filed: Aug. 5, 2020

(65) Prior Publication Data
US 2021/0320798 A1 Oct. 14, 2021

(30) Foreign Application Priority Data
Apr. 8, 2020 (KR) .................. 10-2020-0042959

(51) Int. Cl.
*H04L 9/32* (2006.01)
*G06F 21/32* (2013.01)
*G06V 40/50* (2022.01)

(52) U.S. Cl.
CPC ............ *H04L 9/3213* (2013.01); *G06F 21/32* (2013.01); *G06V 40/50* (2022.01); *H04L 9/3231* (2013.01)

(58) Field of Classification Search
CPC ....... H04L 9/3213; H04L 9/3231; H04L 9/32; G06V 40/50; G06F 21/32
See application file for complete search history.

(56) References Cited

U.S. PATENT DOCUMENTS

| | | | |
|---|---|---|---|
| 6,202,151 B1 | 3/2001 | Musgrave et al. | |
| 9,852,426 B2 | 12/2017 | Bacastow | |
| 10,210,685 B2 | 2/2019 | Borgmeyer | |
| 11,334,882 B1 * | 5/2022 | Jameson | H04L 9/3231 |
| 2006/0064380 A1 | 3/2006 | Zukerman | |
| 2015/0056957 A1 | 2/2015 | Mardikar et al. | |
| 2015/0220918 A1 | 8/2015 | Davis et al. | |
| 2015/0363785 A1 | 12/2015 | Perez et al. | |
| 2018/0096354 A1 | 4/2018 | Kohli | |
| 2018/0108020 A1 | 4/2018 | Thatte et al. | |
| 2018/0241546 A1 * | 8/2018 | Leng | G06Q 20/38215 |
| 2019/0050921 A1 | 2/2019 | Ryner et al. | |
| 2019/0097812 A1 * | 3/2019 | Toth | H04L 9/3213 |
| 2019/0319798 A1 * | 10/2019 | Chalkias | H04L 9/3239 |
| 2021/0034834 A1 * | 2/2021 | Mackin | G06F 21/84 |

FOREIGN PATENT DOCUMENTS

| | | | | |
|---|---|---|---|---|
| AU | 2007313660 B2 | 5/2008 | | |
| DE | 102017006200 A1 * | 1/2019 | ........... | H04L 9/3231 |
| GB | 2564787 A | 1/2019 | | |
| KR | 10-2011-0002968 A | 1/2011 | | |

(Continued)

*Primary Examiner* — Jayesh M Jhaveri
(74) *Attorney, Agent, or Firm* — Jefferson IP Law, LLP

(57) ABSTRACT

An electronic device is provided. The electronic device includes an input/output interface and at least one processor configured to irreversibly generate a first token to use or access an object based on first biometric information input through the input/output interface and information proving ownership of the object, and output the first token through the input/output interface.

15 Claims, 15 Drawing Sheets

(56) References Cited

FOREIGN PATENT DOCUMENTS

| KR | 20180016641 A | * | 1/2013 | ............... | H04L 9/32 |
|----|---------------|---|--------|-----------------|-----------|
| KR | 10-1561170 B1 |   | 10/2015 | | |
| WO | 2013/186682 A1 |   | 12/2013 | | |
| WO | 2017/127871 A1 |   | 8/2017 | | |
| WO | 2018/195644 A1 |   | 11/2018 | | |

* cited by examiner

ELECTRONIC DEVICE AND METHOD OF CONTROLLING THE SAME

CROSS-REFERENCE TO RELATED APPLICATION(S)

This application is based on and claims priority under 35 U.S.C. § 119(a) of a Korean patent application number 10-2020-0042959, filed on Apr. 8, 2020, in the Korean Intellectual Property Office, the disclosure of which is incorporated by reference herein in its entirety.

BACKGROUND

1. Field

The disclosure relates to an electronic device which generates a token to use or access an object and a method of controlling the electronic device.

2. Description of Related Art

Some products require user authentication and purchase authentication, for example, ticket or receipt checking, for a user to use or utilize a product purchased by the user. Thus, it is inconvenient for a user to have both an identity verification method and a purchase authentication method.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device which irreversibly generates a token based on biometric information and information proving the ownership of an object and a method of controlling the electronic device.

Additional aspects will be set forth in part in the description which follows and, in part, will be apparent from the description, or may be learned by practice of the presented embodiments of the disclosure.

In accordance with an aspect of the disclosure, an electronic device is provided. The electronic device includes an input/output interface and at least one processor configured to irreversibly generate a first token to use or access an object based on first biometric information input through the input/output interface and information proving ownership of the object, and output the first token through the input/output interface.

According to an embodiment of the disclosure, the first biometric information that is input includes a plurality of types of biometric information.

According to an embodiment of the disclosure, the first biometric information may include biometric information of a plurality of persons, and the information proving the ownership of the object may include information that proves ownerships of the plurality of persons.

According to an embodiment of the disclosure, the first token includes encryption information randomly generated from a combination of the first biometric information and the information proving the ownership of the object, and assistance information for assisting generation of same encryption information as the encryption information.

According to an embodiment of the disclosure, the first token includes the information proving the ownership of the object.

According to an embodiment of the disclosure, the outputting of the first token through the input/output interface includes outputting information about generation of the first token.

According to an embodiment of the disclosure, the at least one processor may be further configured to irreversibly generate a second token to use or access the object based on second biometric information that is input through the input/output interface and the first token, compare the first token with the second token, and output, through the input/output interface, a result of using or accessing the object, based on a comparison result.

In accordance with another aspect of the disclosure, an electronic device is provided. The electronic device includes an input/output interface and at least one processor configured to receive an input of a first token irreversibly generated to use or access an object and second biometric information based on first biometric information and information proving ownership of the object, irreversibly generate a second token to use or access the object based on the second biometric information and the first token, compare the first token with the second token, and output a result of using or accessing the object through the input/output interface based on a comparison result.

According to an embodiment of the disclosure, the electronic device includes a communication interface, wherein the receiving of the input of the first token includes receiving the first token through the communication interface.

According to another embodiment of the disclosure, a method of controlling an electronic device includes irreversibly generating a first token to use or access an object based on first biometric information that is input and information proving ownership of the object, and outputting the first token.

According to an embodiment of the disclosure, the first biometric information that is input may include a plurality of types of biometric information.

According to an embodiment of the disclosure, the first biometric information includes biometric information of a plurality of persons, and the information proving the ownership of the object may include ownerships of the plurality of persons.

According to an embodiment of the disclosure, the first token includes encryption information randomly generated from a combination of the first biometric information and the information proving the ownership of the object, and assistance information for assisting generation of same encryption information as the encryption information.

According to an embodiment of the disclosure, the first token includes the information proving the ownership of the object.

According to an embodiment of the disclosure, the outputting of the first token includes outputting information about generation of the first token.

According to an embodiment of the disclosure, the method includes irreversibly generating a second token to use or access the object based on second biometric information that is input and the first token comparing the first token with the second token, and outputting a result of using or accessing the object, based on a comparison result.

In accordance with another aspect of the disclosure, a method of controlling an electronic device is provided. The method includes receiving an input of a first token irreversibly generated to use or access an object and second biometric information based on first biometric information and information proving ownership of the object, irreversibly generating a second token to use or access the object based on the second biometric information and the first token, comparing the first token with the second token, and outputting a result of using or accessing the object based on a comparison result.

According to an embodiment of the disclosure, the receiving of the input of the first token includes receiving the first token through communication interface.

According to another embodiment of the disclosure, a computer program product includes a recording medium storing a program for implementing the above methods.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
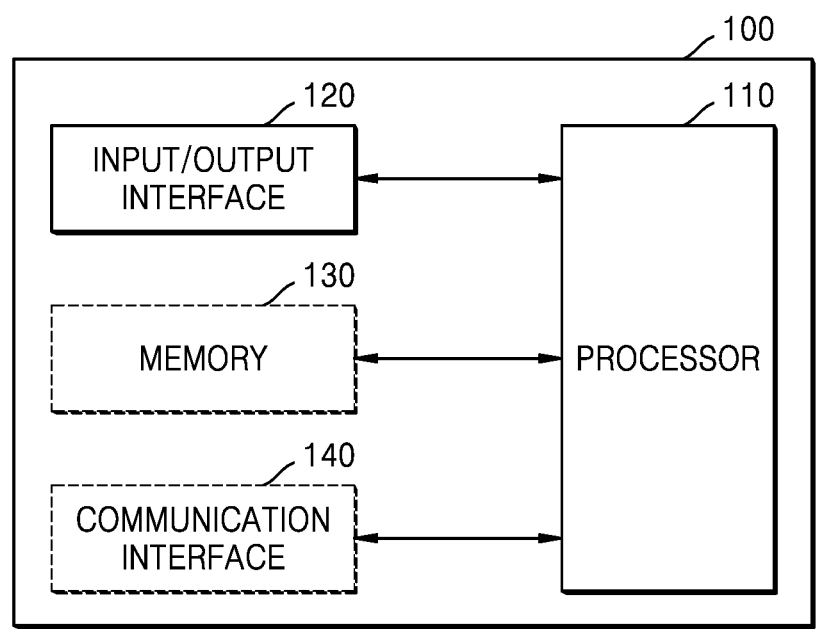
FIG. 1 is a block diagram of an electronic device according to an embodiment of the disclosure.

The following description with reference to the accompanying drawings is provided to assist in a comprehensive understanding of various embodiments the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An expression used in the singular encompasses the expression of the plural, unless it has a clearly different meaning in the context. Unless defined otherwise, all terms used herein including technical or scientific terms have the same meanings as those generally understood by those of ordinary skill in the art to which the disclosure may pertain.

Throughout the disclosure, the expression "at least one of a, b or c" indicates only a, only b, only c, both a and b, both a and c, both b and c, all of a, b, and c, or variations thereof.

When a part may "include" a certain constituent element, unless specified otherwise, it may not be construed to exclude another constituent element but may be construed to further include other constituent elements.

Throughout the drawings, like reference numerals denote like elements. The specification does not describe all components of the embodiments of the disclosure, and general contents, well-known technologies, or redundant contents in the embodiments of the disclosure in the technical field to which the embodiments of the disclosure belong are omitted.

FIG. 1 is a block diagram of an electronic device according to an embodiment of the disclosure.

Referring to FIG. 1, an electronic device 100 may include an input/output interface 120 and a processor 110. A memory 130 or a communication interface 140 may not be included according to an embodiment of the disclosure.

In the specification, an element included in the electronic device 100 may be implemented by one of software, hardware, and firmware, or a plurality of elements may be implemented by one component, or one element may include a plurality of components.

In the specification, the electronic device 100 may be implemented in various forms. For example, the electronic device 100 described in the specification may include a smartphone, a tablet personal computer (PC), a mobile phone, a video phone, an e-book reader, a desktop PC, a laptop PC, a netbook computer, a copyrighted workstation, a server, a personal digital assistant (PDA), a portable multimedia player (PMP), a moving picture experts group (MPEG-1 or MPEG-2) audio layer 3 (MP3) player, a mobile medical apparatus, a camera, a wearable device, a lamp, a weighing scale, or a navigation device, but the disclosure is not limited thereto. Furthermore, the electronic device 100 may be home appliance. The home appliance may include, for example, a television (TV), a digital video disk (DVD) player, an audio system, a refrigerator, an air conditioner, a vacuum cleaner, an oven, a microwave, a washing machine, an air cleaner, a set-top box, a home automation control panel, a security control panel, a game console, an electronic key, a camcorder, an electronic picture frame, etc., but the disclosure is not limited thereto.

The processor 110 may control the overall operation of the electronic device 100. For example, the processor 110 may generally control the input/output interface 120 or the communication interface 140 by executing programs stored in the memory 130. The processor 110 may include one or more processors.

The processor 110 may irreversibly generate a token to use or access an object based on biometric information and information proving the ownership of the object.

The object may mean one subject or thing that can be owned by person(s). For example, the object may include a concert viewing service, a hotel accommodation service, an electronic device, a car, a pet, a streaming service, or copyrights, but the disclosure is not limited thereto.

The information proving the ownership of the object may mean information that proves one's own ownership of the object. For example, when the concert viewing service is the object, information that proves the concert viewing service is one's own ownership may include information about reservation details or purchase history regarding the concert viewing service, but the disclosure is not limited thereto. Owning the concert viewing service may mean that one owns a right to use a concert viewing service at a specified date and specified seat based on the concert viewing service purchase history information.

The token may mean the encryption of particular information to use or access an object. For example, when a token is generated based on a fingerprint and purchase history information regarding the concert viewing service, the fingerprint and the purchase history information regarding the concert viewing service may be encrypted into one token. Furthermore, the token may be encrypted, without limitation in the form, in a digital form, for example, a series of text strings, or a non-digital form, for example, QR codes. In one embodiment of the disclosure, when the token is encrypted in a digital form, the processor 110 may output information about a success/failure of the generation of a token, through the input/output interface 120.

In one embodiment of the disclosure, the token may include the information proving the ownership of the object. In this case, even when the electronic device 100 is offline, the use or access of the object may be verified.

The input/output interface 120 may include an interface capable of at least one of input or output. For example, the input/output interface 120 may include a display, a touch screen, a touch pad, an audio input/output portion, a camera, an HDMI, or a USB, or a combination thereof, but the disclosure is not limited thereto.

According to an embodiment of the disclosure, the input/output interface 120 may receive information (including a signal), for example, biometric information (biometrics) and transfer the information to the processor 110. The biometric information may mean personal information related to human characteristics. For example, the biometric information may include an iris, a face, a fingerprint, voice, or a vein, but the disclosure is not limited thereto.

According to an embodiment of the disclosure, the electronic device 100 may include the memory 130. The memory 130 may store programs for processing and controlling the processor 110, and pieces of input/output information, for example, purchase history information, token, contents, etc.

The memory 130 may include at least one type of storage media, such as a flash memory type, a hard disk type, a multimedia card micro type, a card type memory, for example, secure digital (SD) or extreme digital (XD) memory, random access memory (RAM) static random access memory (SRAM), read-only memory (ROM), electrically erasable programmable read-only memory (EEPROM), programmable read-only memory (PROM), a magnetic memory, a magnetic disc, or an optical disc. Furthermore, the electronic device 100 may use a web storage or a cloud server that provides a storage function of the memory 130 on the Internet. The electronic device 100, communicating with a web storage or a cloud server, may store a signal or data in the web storage or the cloud server, or receive a signal or data from the web storage or the cloud server. In the following description, for convenience of understanding of the disclosure, the memory 130 is illustrated and described below. When an external server that performs a storage function is used, the memory 130 may not be included as an element.

According to an embodiment of the disclosure, the electronic device 100 may include the communication interface 140. The communication interface 140 may transmit/receive a signal to/from an external electronic device, a network, for example, a 3GPP network, or an external server. The signal transmitted/received by the communication interface 140 may include control information and data. The communication interface 140 may include an RF transmitter for up-converting and amplifying the frequency of a transmitted signal and an RF receiver for low-noise amplifying a received signal and down-converting the frequency of the signal. However, this is merely one embodiment of the disclosure of the communication interface 140, and the constituent elements of the communication interface 140 are not limited to the RF transmitter and the RF receiver. Furthermore, the communication interface 140 may receive a signal through a wireless channel and transmit the signal to the processor 110, and also transmit to other electronic device a signal output from the processor 110 through the wireless channel.

An airline service requires identity verification through a passport and ticket check to board an aircraft. A locker service requires a locking history and a password for a specific locker to retrieve one's own goods. The concert viewing service requires a concert ticket and identification to enter a concert.

As such, as some objects require, for use or access, both of identity verification and information proving the ownership of an object, for example, a ticket, it is a problem that a user queue gets longer. In another aspect, a user inconveniently prepares both of an identity verification means and information proving the ownership of an object for use or access of an object. According to an embodiment of the disclosure, the identify verification means and the proving information may be irreversibly generated as one token. Accordingly, a user may use or access of an object with a token only.

Figure 2:
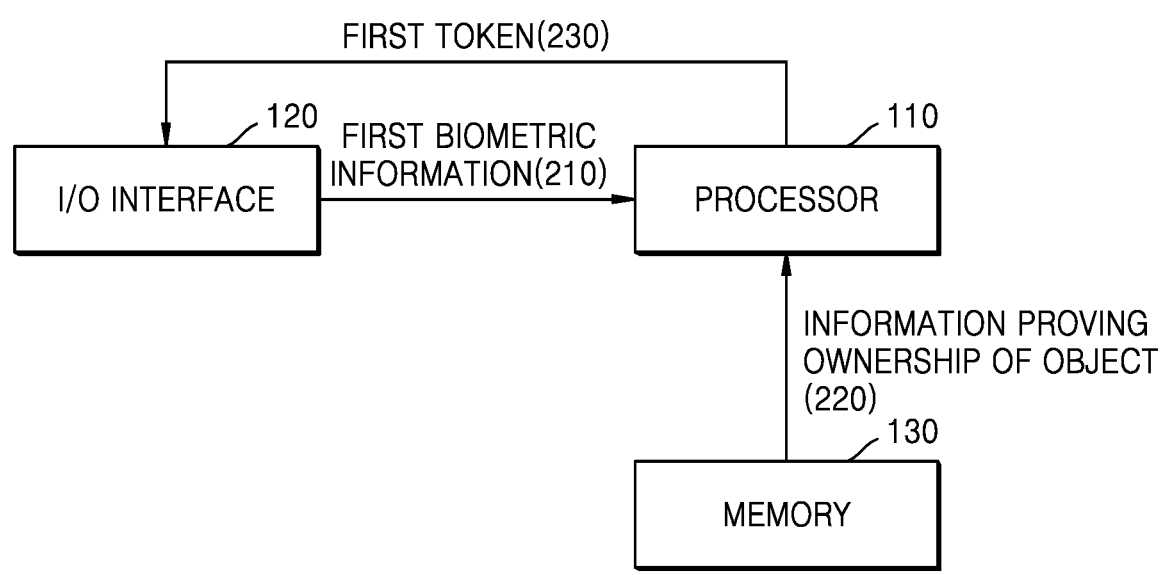
FIG. 2 is a block diagram of a flow of information in an electronic device according to an embodiment of the disclosure.

FIG. 2 is a block diagram of a flow of information in an electronic device according to an embodiment of the disclosure.

Referring to FIG. 2, the input/output interface 120 may receive first biometric information 210 and transmit the information to the processor 110. The memory 130 may transmit information proving ownership of object 220 to the processor 110. In another embodiment of the disclosure, the processor 110 may receive the information proving ownership of object 220 from an external server (not shown). Even when only the memory 130 is illustrated in the drawings, it may be interpreted that the processor 110 may receive the information proving ownership of object 220 from an external server (not shown), not from the memory 130.

The processor 110 may irreversibly generate a first token 230 based on the first biometric information 210 and the information proving ownership of object 220. For example, the processor 110 may generate the first token 230 by applying a fuzzy extractor to the first biometric information 210 and the information proving ownership of object 220. The fuzzy extractor, which is a well-known encryption technology for security of biometric information, may uniformly and randomly extract a text string from the input. The processor 110 may use a fuzzy extractor with an input of the first biometric information and the information proving ownership of object 220. Accordingly, as the number of inputs to be extracted increases, cryptography strength of the first token 230 may be increased.

The processor 110 may output the first token 230 that is generated through the input/output interface 120. The first token 230 may be visually or audibly output through the input/output interface 120. For example, the first token 230 may be displayed through a touch screen or radiated in the form of a sound wave through a speaker, but the disclosure is not limited thereto. In one embodiment of the disclosure, when a token is encrypted in a digital form, for example, a series of text strings, the processor 110 may output information about the generation of a token through the input/output interface 120.

In one embodiment of the disclosure, the processor 110 may store the first token 230 that is generated in the memory 130. In another embodiment of the disclosure, the processor 110 may transmit the first token 230 through the communication interface 140 to be stored in an external server (not shown).

Figure 3:
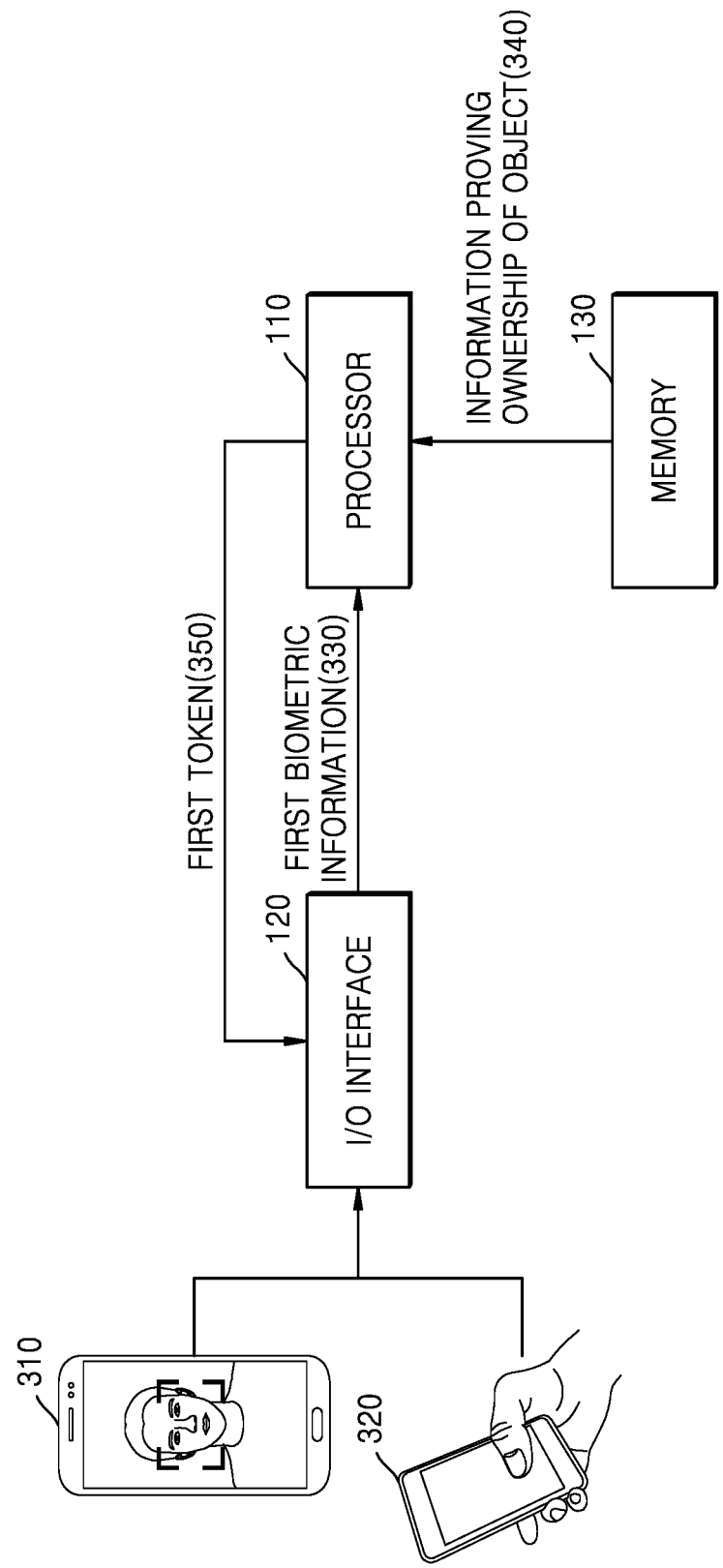
FIG. 3 is a block diagram of biometric information input to an electronic device according to an embodiment of the disclosure.

FIG. 3 is a block diagram of biometric information input to an electronic device according to an embodiment of the disclosure. In FIG. 3, any redundant configuration to that of FIG. 2 is briefly described.

Referring to FIG. 3, face information 310 and fingerprint information 320 may be input through the input/output interface 120. The input/output interface 120 may transmit the face information 310 and the fingerprint information 320, as first biometric information 330, to the processor 110. In other words, the first biometric information 330 may include a plurality of pieces of biometric information. The pieces of biometric information may be biometric information of a plurality of persons or various other types of biometric information of the same person.

The processor 110 may generate a first token 350 based on the first biometric information 330 and information proving ownership of object 340. The first token 350 that is generated may be output through the input/output interface 120.

Figure 4:
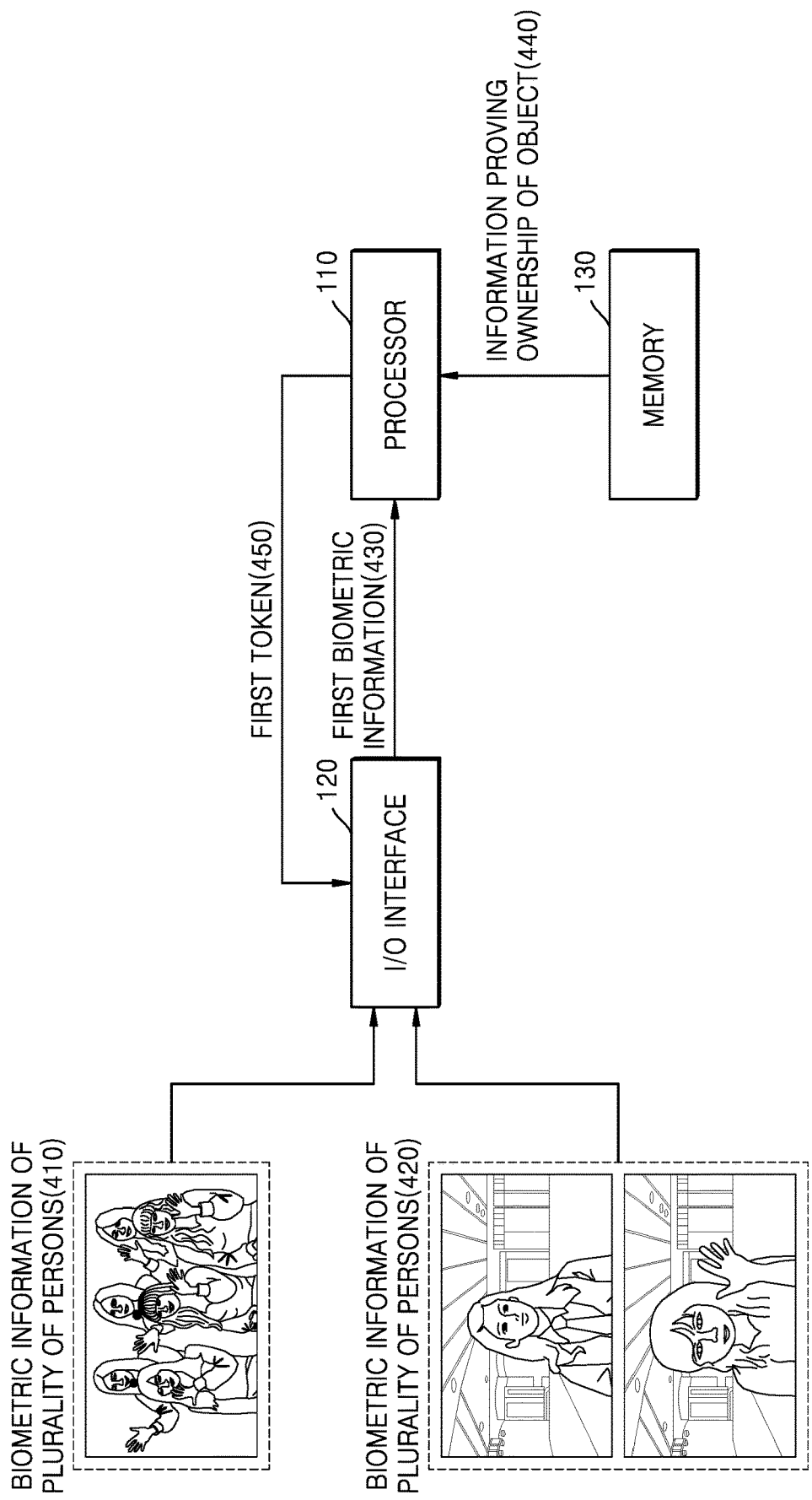
FIG. 4 is a block diagram of biometric information input to an electronic device according to an embodiment of the disclosure.

FIG. 4 is a block diagram of biometric information input to an electronic device according to an embodiment of the disclosure. In FIG. 4, any redundant configuration to that of FIG. 2 is briefly described.

Referring to FIG. 4, biometric information 410 of a plurality of persons may be one piece of biometric information including a plurality of persons. Biometric information 420 of a plurality of persons may be a plurality of pieces of biometric information, each including a different person. The biometric information 410 and 420 of a plurality of persons may be input through the input/output interface 120. Although the biometric information 410 and 420 of a plurality of persons are illustrated as face information, the disclosure is not limited thereto.

The input/output interface 120 may transmit the biometric information 410 or 420 of a plurality of persons, as first biometric information 430, to the processor 110. In other words, the first biometric information 430 may include the biometric information of a plurality of persons.

The processor 110 may generate a first token 450 based on the first biometric information 430 and information proving ownership of object 440. The first token 450 that is generated may be output through the input/output interface 120. Accordingly, when authentication of a plurality of persons is needed to use or access an object, for example, when an object is shared, a user may input the biometric information 410 and 420 of a plurality of persons to the input/output interface 120, and the processor 110 may generate the first token 450 that needs the authentication of a plurality of persons.

Figure 5:
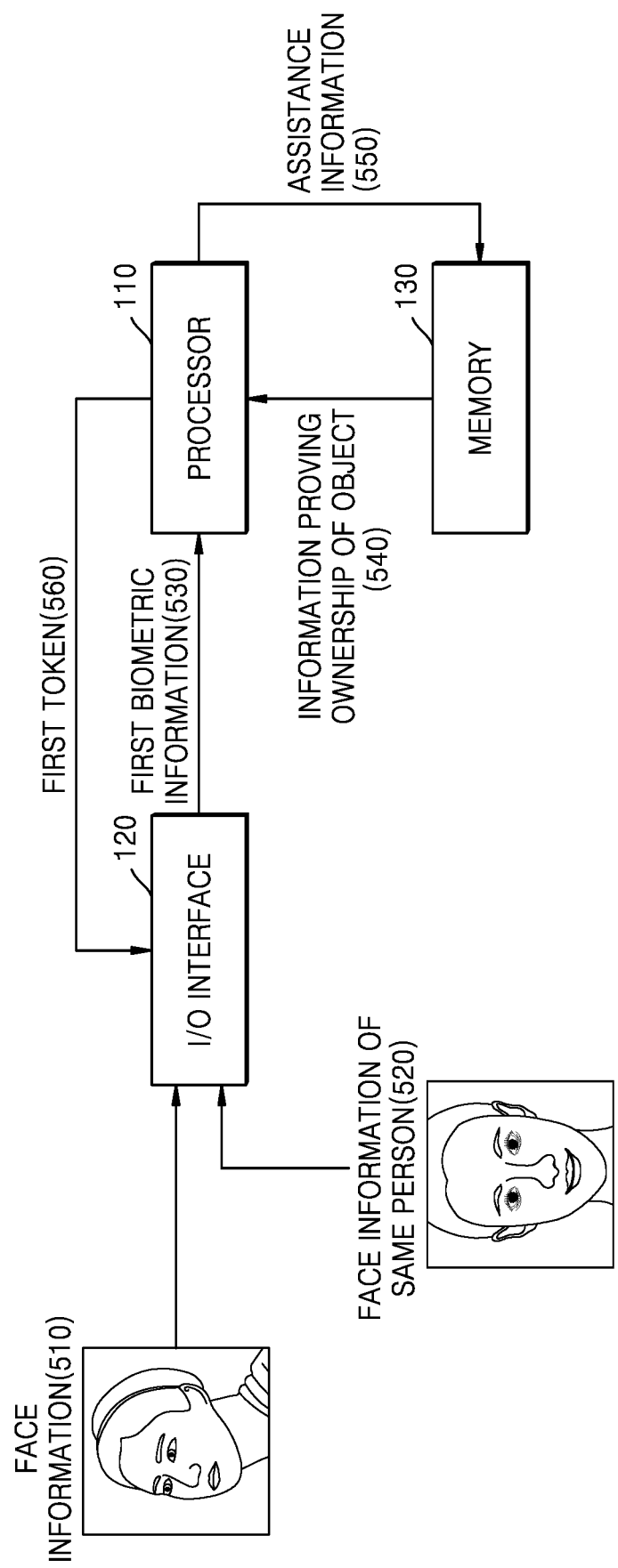
FIG. 5 is a block diagram of a token generated by an electronic device according to an embodiment of the disclosure.

FIG. 5 is a block diagram of a token generated by an electronic device according to an embodiment of the disclosure. In FIG. 5, any redundant configuration to that of FIG. 2 is briefly described.

Referring to FIG. 5, face information 510 may be input to the electronic device 100 through the input/output interface 120. The input/output interface 120 may transmit the face information 510 as first biometric information 530 to the processor 110. The processor 110 may irreversibly generate a first token 560 based on the first biometric information 530 and information proving ownership of object 540.

The processor 110 may generate encryption information and assistance information 550 by applying a fuzzy extractor, which is a well-known encryption technology for security of biometric information, to the first biometric information 530 and the information proving ownership of object 540.

The encryption information is information that is encrypted so that the first biometric information 530 and the information proving ownership of object 540 are not identified. As described above regarding the fuzzy extractor, the processor 110 may uniformly and randomly extract a text string from the first biometric information 530 and the information proving ownership of object 540. The processor 110 may generate an extracted text string as encryption information. Accordingly, as the text string is uniformly and randomly extracted, the first biometric information 530 and the information proving ownership of object 540 may not be regenerated through the encryption information. In other words, irreversible generation is possible.

In one embodiment of the disclosure, the assistance information 550 is information for assisting generation of the same encryption information with respect to the biometric information of the same person. For example, when the same biometric information as the face information 510 when the first token 560 is generated is required to use or access an object, a user may be impossible or difficult to use or access an object. Accordingly, even when there is a slight difference from the face information 510, the face information 520 of the same person may generate the same encryption information so that a user conveniently uses or accesses an object.

Figure 8:
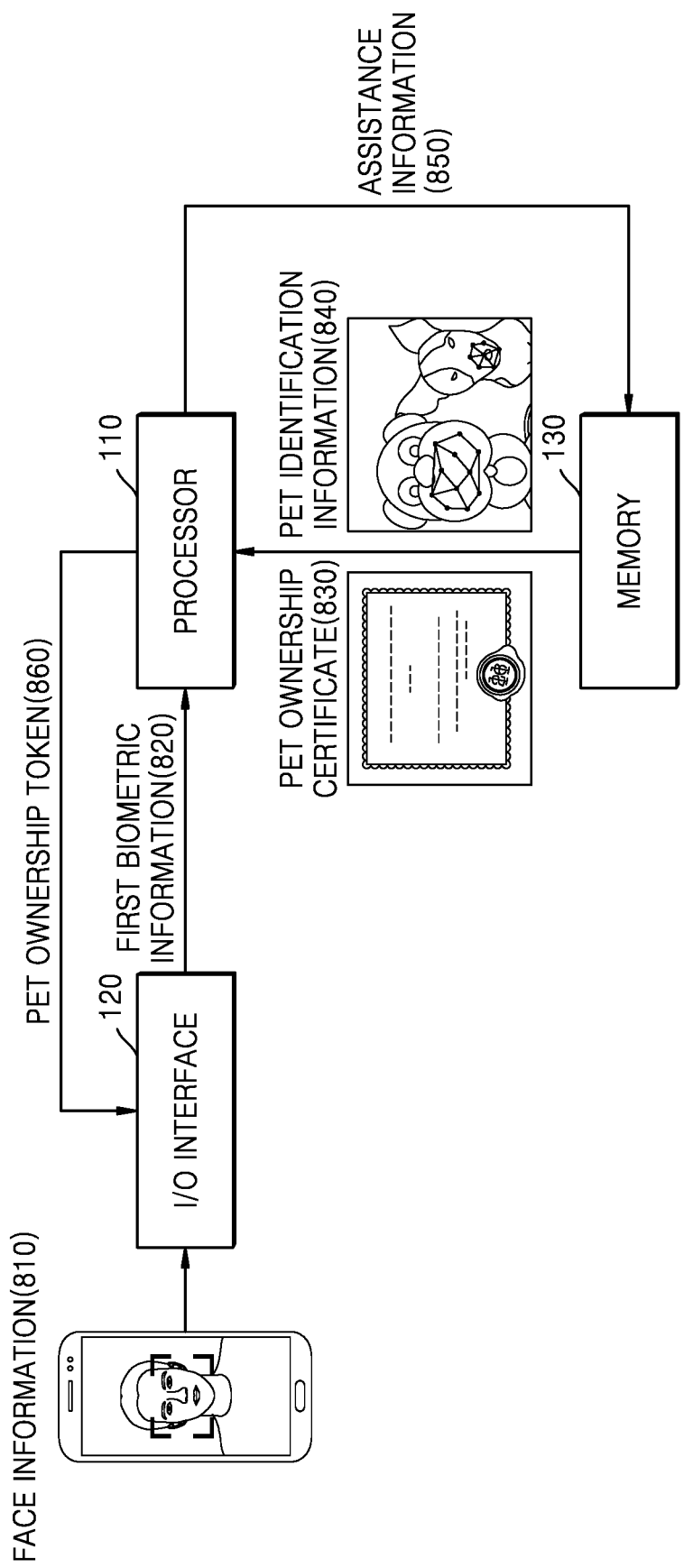
FIG. 8 is a block diagram of a pet ownership token generated by an electronic device according to an embodiment of the disclosure.

In another embodiment of the disclosure, the assistance information 550 may be information for assisting generation of the same encryption information with respect to the biometric information of the same person and the same object, which is described in FIG. 8.

The processor 110 may store, in the memory 130, the assistance information 550 regarding the encryption information generated based on the first biometric information 530 and the information proving ownership of object 540. Accordingly, when the encryption information is generated based on the face information 520 of the same person and the information proving ownership of object 540, the processor 110 may generate, by using the assistance information 550, the same encryption information as the encryption information generated based on the face information 510.

In another embodiment of the disclosure, the processor 110 may generate the first token 560 including the assistance information 550. Another electronic device may receive the first token 560 and the face information 520 of the same person. Another electronic device may generate the encryption information and the same encryption information generated based on the face information 510, by using the assistance information 550 included in the first token 560.

As such, the encryption information may not include information related to the first biometric information 530 and the information proving ownership of object 540. Furthermore, as the assistance information 550 is information for assisting generation of the same encryption information, even when the first token 560 is exposed to a third person, the security of the first biometric information 530 may be maintained. Furthermore, a detailed description of an operation that the processor 110 generates the same encryption information by using the assistance information 550 is omitted because the operation is based on a well-known technology regarding a fuzzy extractor, for example, a theory regarding the generation of an encryption key using biometric information disclosed in Korean Patent No. 10-1984033.

Figure 6:
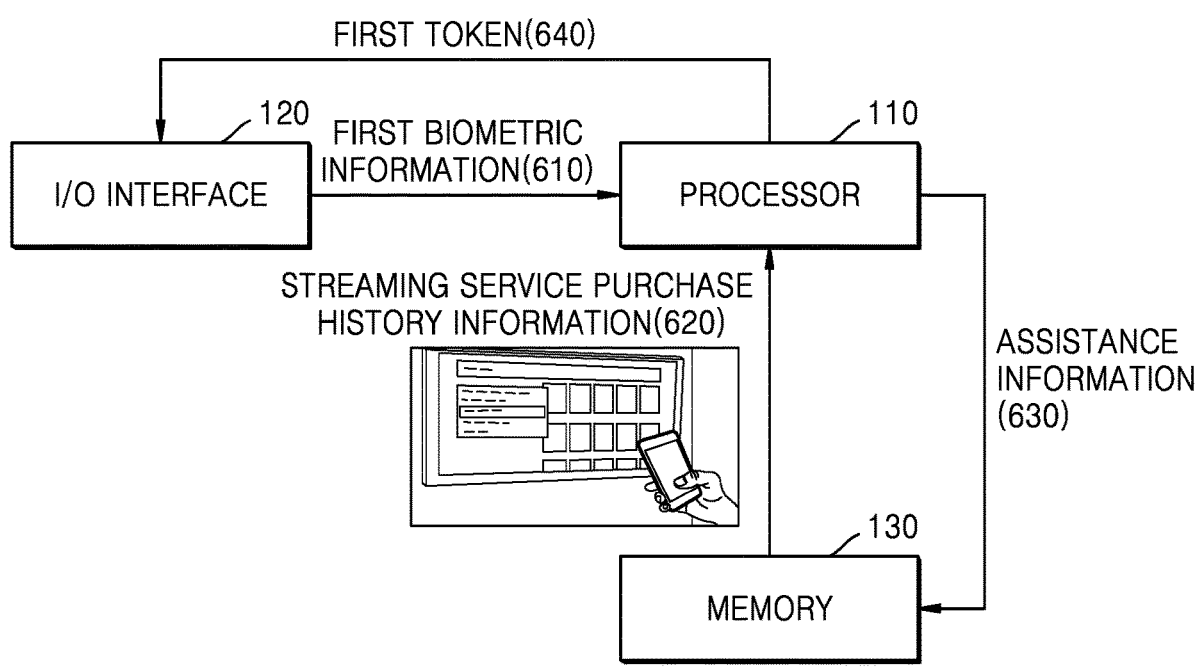
FIG. 6 is a block diagram illustrating information proving ownership of an object according to an embodiment of the disclosure.

FIG. 6 is a block diagram illustrating information proving ownership of an object according to an embodiment of the disclosure. In FIG. 6, any redundant configuration to that of FIG. 2 is briefly described.

Referring to FIG. 6, streaming service purchase history information 620 is one embodiment of the disclosure of the information proving ownership of object 220, and may mean information regarding purchase of a service of real-time reproducing voice or image on the Internet.

The input/output interface 120 may transmit first biometric information 610 to the processor 110. The processor 110 may generate a first token 640 based on the first biometric information 610 and the streaming service purchase history information 620. Furthermore, the processor 110 may store assistance information 630 about encryption information of the first token 640 that is generated, in the memory 130, or include the assistance information 630 in the first token 640.

When the first token 640 is encrypted in a digital form, for example, a series of text strings, the processor 110 may output information about a success/failure of the generation of the first token 640, through the input/output interface 120. For example, when a user purchases a streaming service and inputs the first biometric information 610 to the input/output interface 120 of the electronic device 100, the processor 110 may output a user registration completion message regarding the purchased streaming service through the input/output interface 120.

Figure 7:
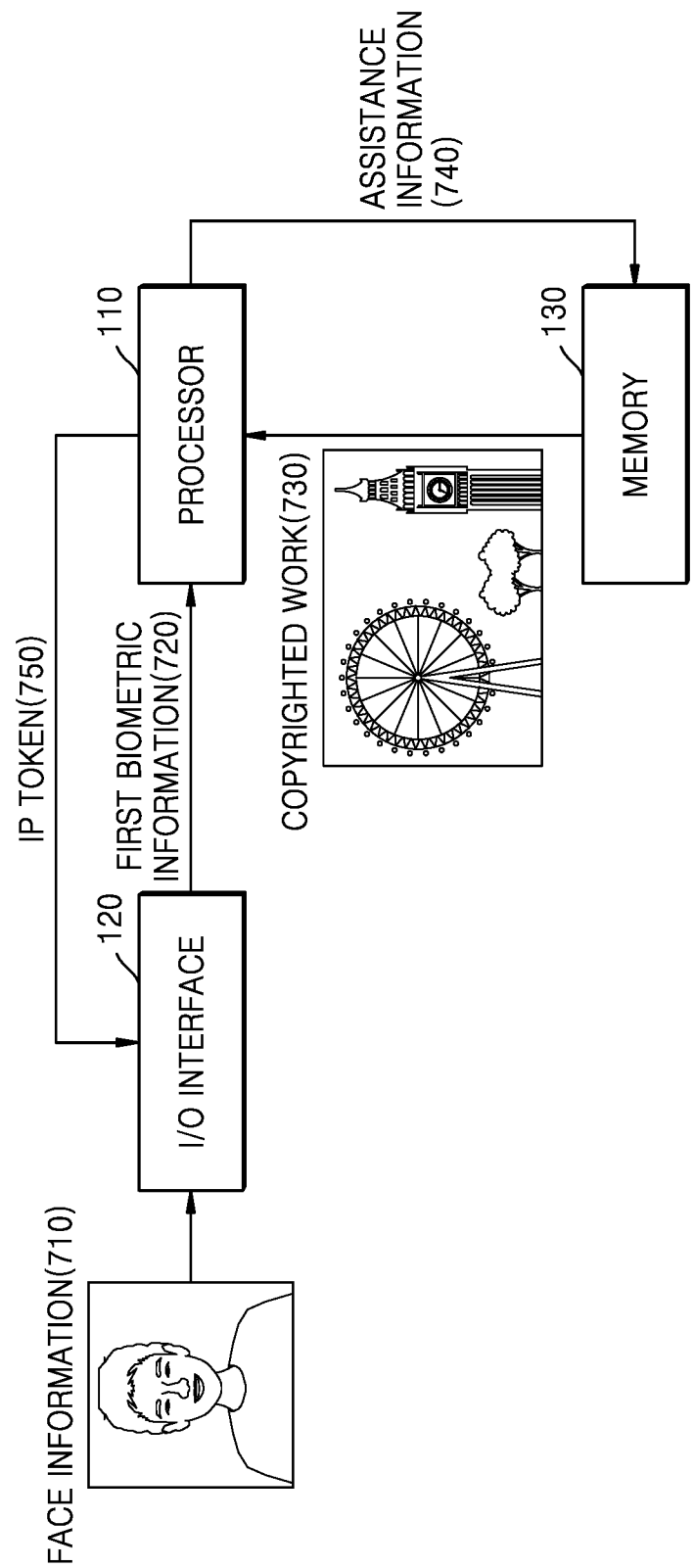
FIG. 7 is a block diagram of an intellectual property (IP) token generated by an electronic device according to an embodiment of the disclosure.

FIG. 7 is a block diagram of an intellectual property (IP) token generated by an electronic device according to an embodiment of the disclosure. In FIG. 7, any redundant configuration to that of FIG. 2 is briefly described.

Referring to FIG. 7, face information 710 is input to the electronic device 100 through the input/output interface 120. The input/output interface 120 may transmit the face information 710 as first biometric information 720 to the processor 110. The processor 110 may irreversibly generate an intellectual property (IP) token 750 based on the first biometric information 720 and a copyrighted work 730. Furthermore, the processor 110 may store assistance information 740 about encryption information of the IP token 750 that is generated, in the memory 130, or include the assistance information 740 in the IP token 750.

The copyrighted work 730 may be contents generated in the electronic device 100. For example, the copyrighted work 730 may include any contents generated in the electronic device 100, that is, images or videos captured, or algorithms or novels created by using the electronic device 100, but the disclosure is not limited thereto. Furthermore, the copyrighted work 730 may include modifications of existing contents performed in the electronic device 100, for example, a secondary copyrighted work. As such, as the copyrighted work 730 requires to be generated in the electronic device 100, the copyrighted work 730 may be used as information proving the ownership of copyrights.

The IP token 750 may mean the encryption of the first biometric information 720 and the copyrighted work 730 to use or access the copyrighted work 730. Accordingly, as the face information 710 of the same person is required to use or access the copyrighted work 730, copyright-related disputes may be solved or prevented in advance.

The processor 110 may output the IP token 750 that is generated, through the input/output interface 120. In another embodiment of the disclosure, the processor 110 may output information about a success/failure of the generation of the IP token 750.

FIG. 8 is a block diagram of a pet ownership token generated by an electronic device according to an embodiment of the disclosure. In FIG. 8, any redundant configuration to that of FIG. 2 is briefly described.

Referring to FIG. 8, face information 810 is input to the electronic device 100 through the input/output interface 120. The input/output interface 120 may transmit the face information 810 as first biometric information 820 to the processor 110. The processor 110 may irreversibly generate a pet ownership token 860 based on the first biometric information 820, a pet ownership certificate 830, and pet identification information 840. Furthermore, the processor 110 may store assistance information 850 about encryption information of the pet ownership token 860 that is generated, in the memory 130, or include the assistance information 850 in the pet ownership token 860.

The pet identification information 840 may include information about the biological properties of a pet. For example, for puppies of the same breed, the pet identification information 840 may include a nose print, but the disclosure is not limited thereto.

The assistance information 850 may be information for assisting generation of face information of the same person and the same encryption information with respect to the same pet. For example, when the information proving the ownership of an object, for example, the same nose print, which is the same as the pet identification information 840 when the pet ownership token 860 is generated, is required to identify the ownership of a pet, a user may be impossible or difficult to identify the ownership of a pet. Accordingly, even when there is a slight difference from the pet identification information 840, the same pet may generate the same encryption information so that the user may conveniently authenticate the ownership of a pet.

The pet ownership token 860 may mean the encryption of the first biometric information 820, the pet ownership certificate 830, and the pet identification information 840 to check the ownership of a pet.

The processor 110 may output the pet ownership token 860 that is generated, through the input/output interface 120. In another embodiment of the disclosure, the processor 110 may output information about the generation of the pet ownership token 860, for example, information about a success/failure of the generation of a token.

Figure 9:
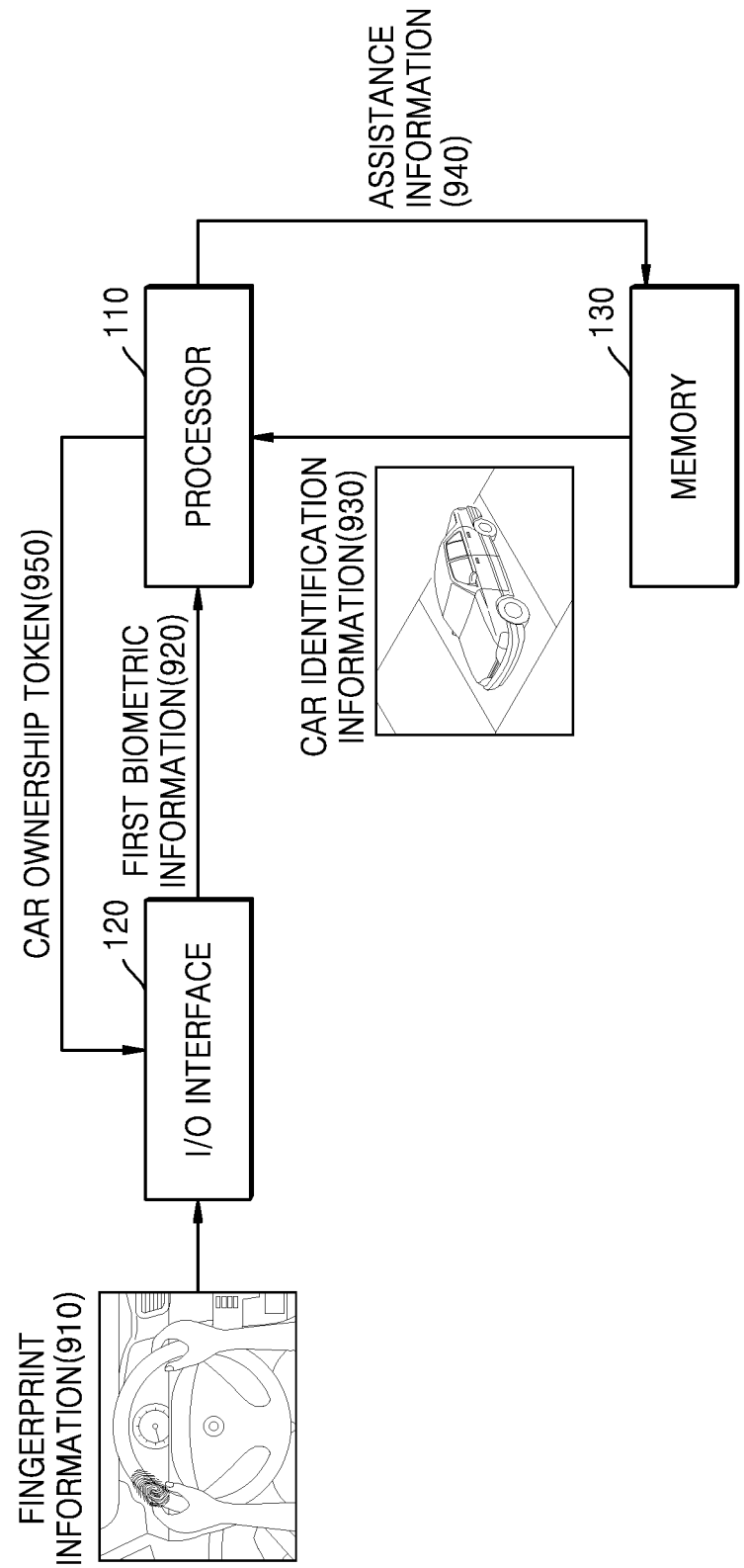
FIG. 9 is a block diagram of a car ownership token generated by an electronic device according to an embodiment of the disclosure.

FIG. 9 is a block diagram of a car ownership token generated by an electronic device according to an embodiment of the disclosure. In FIG. 9, any redundant configuration to that of FIG. 2 is briefly described.

Referring to FIG. 9, fingerprint information 910 may be input to the electronic device 100 through the input/output interface 120, for example, a handle. The handle may transmit the fingerprint information 910 as first biometric information 920 to the processor 110. The processor 110 may irreversibly generate a car ownership token 950 based on the first biometric information 920 and car identification information 930. Furthermore, the processor 110 may store assistance information 940 about encryption information of the car ownership token 950 that is generated, in the memory 130, or include the assistance information 940 in the car ownership token 950.

The car identification information 930 may be information to identify a car and may include a unique code, a product number, etc. assigned to the car, but the disclosure is not limited thereto. In another embodiment of the disclosure, the processor 110 may irreversibly generate the car ownership token 950 based on the first biometric information 920 and car purchase history information, for example, a car sales contract. In another embodiment of the disclosure, the processor 110 may irreversibly generate the car ownership token 950 based on the first biometric information 920, the car identification information 930, and the car purchase history information.

The car ownership token 950 may mean the encryption of the first biometric information 920 and the car identification information 930 to use a car. Accordingly, as the fingerprint information 910 of the same person is required to use a car, a resale problem of stolen vehicles may be prevented.

The processor 110 may output the car ownership token 950 that is generated, through the input/output interface 120. In another embodiment of the disclosure, the processor 110 may output information about the generation of the car ownership token 950, for example, information about a success/failure of the generation of a token.

Figure 10:
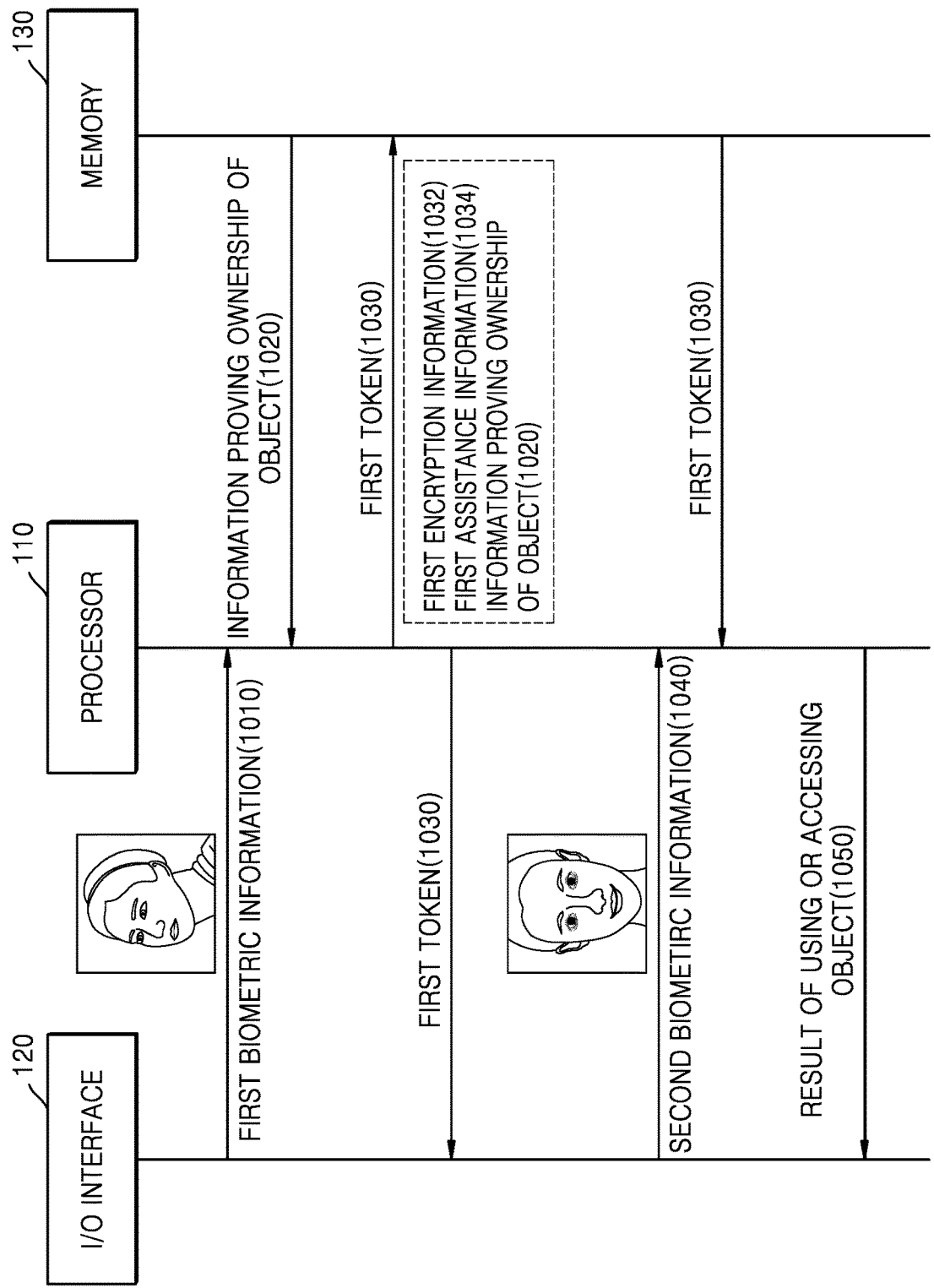
FIG. 10 is a block diagram of a flow of information in an electronic device according to an embodiment of the disclosure.

FIG. 10 is a block diagram of a flow of information in an electronic device according to an embodiment of the disclosure. In FIG. 10, any redundant configuration to that of FIG. 2 is briefly described.

Referring to FIG. 10, the input/output interface 120 may transmit first biometric information 1010 to the processor 110. The memory 130 may transmit information proving ownership of object 1020 to the processor 110. The processor 110 may generate a first token 1030 based on the first biometric information 1010 and the information proving ownership of object 1020.

Furthermore, the processor 110 may store the first token 1030 in the memory 130. The processor 110 may output the first token 1030 through the input/output interface 120. In another embodiment of the disclosure, the processor 110 may output the first token 1030 through the input/output interface 120 and store the first token 1030 in the memory 130.

The input/output interface 120 may transmit second biometric information 1040 to the processor 110. The processor 110 may irreversibly generate a second token (not shown) based on the second biometric information 1040 and the first token 1030.

The first token 1030 may include first encryption information 1032, the first assistance information 1034, and the information proving ownership of object 1020. As described above, the processor 110 may generate the second token by applying a fuzzy extractor to the second biometric information 1040 and the first token 1030. The second token, like the first token 1030, may include second encryption information, second assistance information, and the information proving ownership of object 1020. In another embodiment of the disclosure, the second token may include only second encryption information.

The processor 110 may compare the first token 1030 with the second token. In another embodiment of the disclosure, the processor 110 may compare the first encryption information 1032 with second encryption information (not shown).

The processor 110 may output a result 1050 of using or accessing the object through the input/output interface 120 based on a comparison result. For example, the result 1050 may include a case in which an object may be used or accessed when the first token 1030 and the second token are the same and a case in which an object may not be used or accessed when the first token 1030 and the second token are not the same. In another embodiment of the disclosure, the object use or access result 1050 may be determined based on whether the first encryption information 1032 and the second encryption information are the same.

Figure 11:
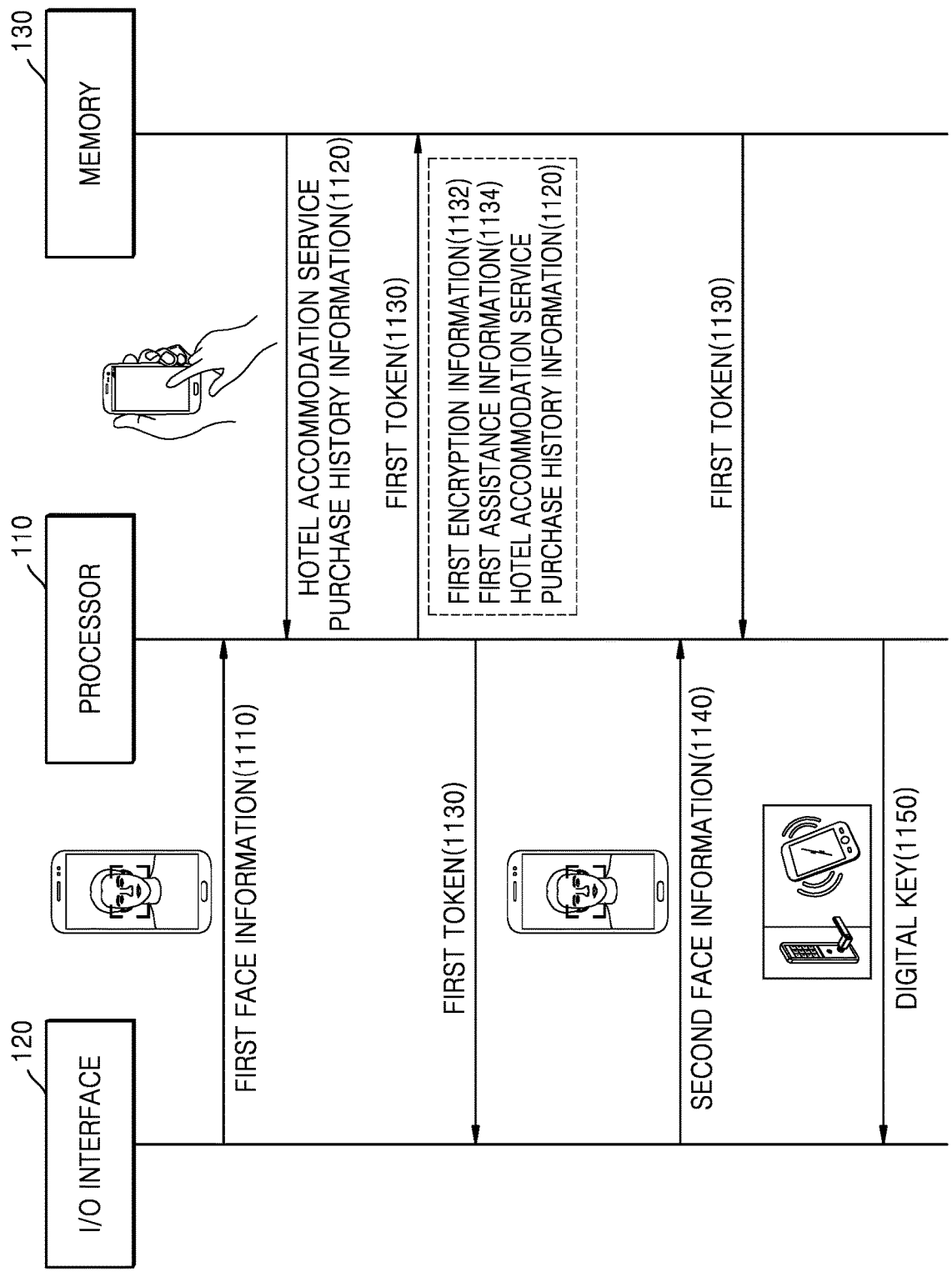
FIG. 11 is a block diagram of a flow of information in an electronic device according to an embodiment of the disclosure.

FIG. 11 is a block diagram of a flow of information in an electronic device according to an embodiment of the disclosure. In FIG. 11, any redundant configuration to that of FIG. 10 is briefly described.

Referring to FIG. 11, the input/output interface 120 may transmit first face information 1110 to the processor 110. The memory 130 may transmit hotel accommodation service purchase history information 1120 to the processor 110. Owning a hotel accommodation service may mean having a right to use hotel accommodation service in a specified room for a specified period based on the hotel accommodation service purchase history information 1120.

The processor 110 may generate a first token 1130 based on the first face information 1110 and the hotel accommodation service purchase history information 1120. The first token 1130 may include first encryption information 1132, first assistance information 1134, and the hotel accommodation service purchase history information 1120.

Furthermore, the processor 110 may output the first token 1130 through the input/output interface 120. The processor 110 may store the first token 1130 in the memory 130. In another embodiment of the disclosure, the processor 110 may store the first token 1130 in the memory 130 by changing an order of operations and output the first token 1130 through the input/output interface 120.

The input/output interface 120 may transmit second face information 1140 to the processor 110. The processor 110 may irreversibly generate the second token based on the second face information 1140 and the first token 1130. In another embodiment of the disclosure, the processor 110 may generate only the second encryption information.

The processor 110 may compare the first token 1130 with the second token. The processor 110 may output a result of accessing a hotel accommodation service, for example, a digital key 1150, based on a comparison result, through the input/output interface 120. In this case, because the second face information 1140 of the same person as the first face information 1110 is input, an access to a hotel accommodation service is possible and thus the digital key 1150 is output. In another embodiment of the disclosure, when the processor 110 generates only the second encryption information, the processor 110 may compare the first encryption information 1132 and the second encryption information.

Figure 12:
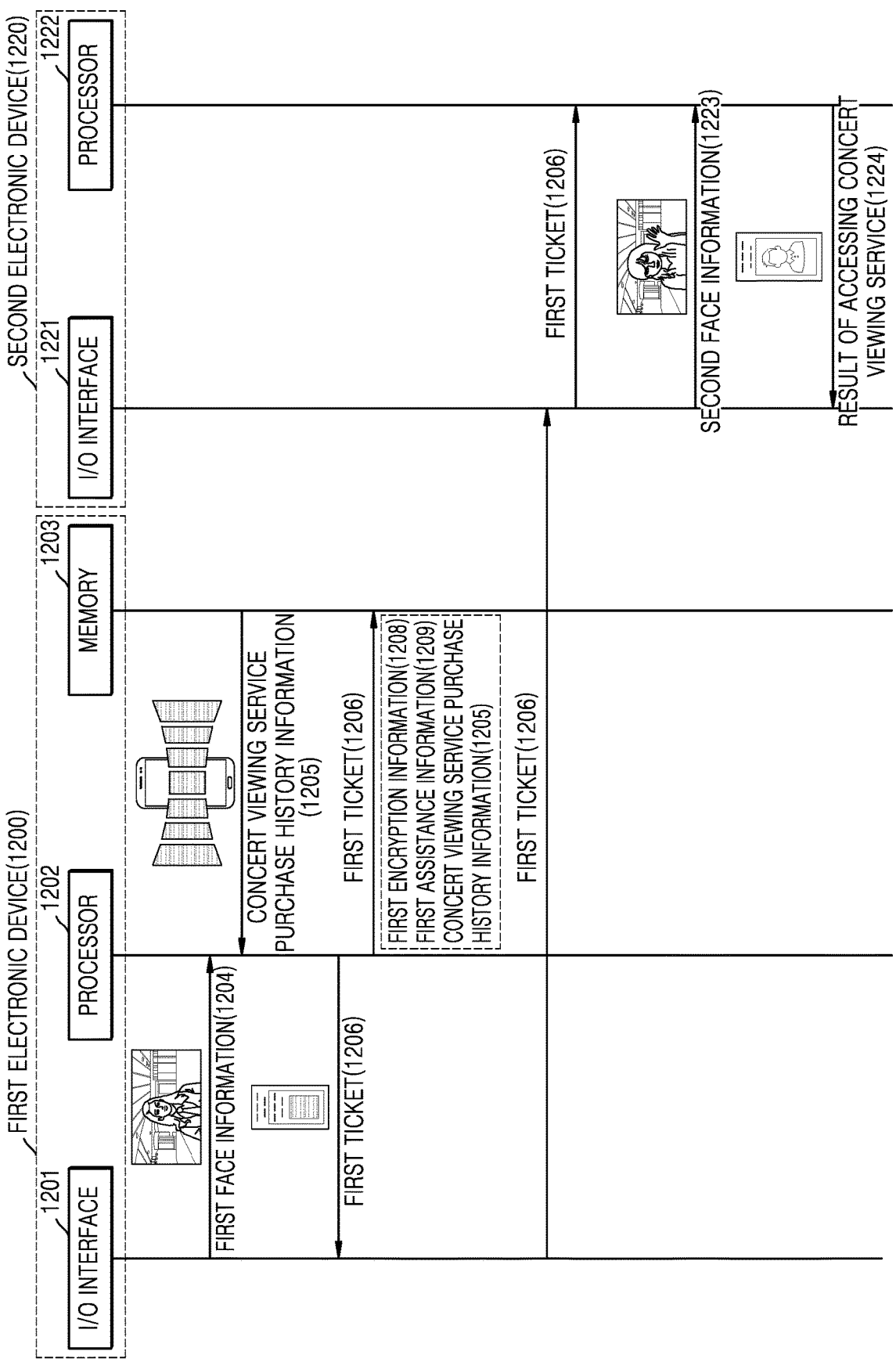
FIG. 12 is a block diagram of a flow of information in a first electronic device and a second electronic device according to an embodiment of the disclosure.

FIG. 12 is a block diagram of a flow of information in a first electronic device and a second electronic device according to an embodiment of the disclosure.

Referring to FIG. 12, a first electronic device 1200 and a second electronic device 1220 are divided according to a use, for convenience of explanation, and have the same configuration described above as the electronic device 100. Accordingly, in FIG. 12, any redundant configuration to that of FIG. 2 is briefly described.

The first electronic device 1200 is the electronic device 100 for generating a first ticket 1206 to use or access a concert viewing service. For example, the first electronic device 1200 may be the electronic device 100 of a user purchased a concert ticket.

The second electronic device 1220 may be the electronic device 100 to verify a use or access of a concert viewing service. For example, the second electronic device 1220 may be the electronic device 100 carried by an employee who manages a concert entry.

An input/output interface 1201 may transmit first face information 1204 to a processor 1202. A memory 1203 may transmit concert viewing service purchase history information 1205 to the processor 1202. The processor 1202 may irreversibly generate the first ticket 1206 based on the first face information 1204 and the concert viewing service purchase history information 1205. The first ticket 1206 may include first encryption information 1208, first assistance information 1209, and the concert viewing service purchase history information 1205.

A processor 1222 may output the first ticket 1206 the input/output interface 1201. An input/output interface 1221 may receive the first ticket 1206 that is output by the first electronic device 1200. For example, when the first ticket 1206 generated by the first electronic device 1200 is displayed on a touch screen, the input/output interface 1221, like a camera, may receive the first ticket 1206. Furthermore, the input/output interface 1221 may receive second face information 1223 and transmit the second face information 1223 to the processor 1222.

In another embodiment of the disclosure, a communication interface (not shown) of the second electronic device 1220 may receive the first ticket 1206 from the first electronic device 1200. The communication interface may transmit the first ticket 1206 that is received, to the processor 1222. When the second electronic device 1220 stores the first ticket 1206 that is received, a user may carry only face information to use a concert viewing service. In other words, a user may use a concert viewing service with only an input of face information even without carrying a concert ticket and an identification card.

The processor 1222 may irreversibly generate a second ticket (not shown) based on the first ticket 1206 and the second face information 1223. In another embodiment of the disclosure, the processor 1222 may generate only the second encryption information.

The processor 1222 may compare the first ticket 1206 and the second ticket. The processor 1222 may output a result 1224 of accessing the concert viewing service through the input/output interface 1221 based on a comparison result. In this case, the result 1224 is that accessing the concert viewing service is impossible because the second face information 1223 of a different person from the first face information 1204 is input. In another embodiment of the disclosure, when the processor 1222 generates only the second encryption information, the processor 110 may compare the first encryption information 1208 with the second encryption information.

An authentication method through biometric information is convenient and has high cryptography strength. However, as person's biometric information is unchangeable, even one-time leakage may critically damage stability and security of the authentication method through biometric information. To solve the above problem, in general, the authentication method through biometric information may use an infrastructure established for security of biometric information.

In one embodiment of the disclosure, as described above, the first encryption information 1208 does not include information about the first face information 1204. Furthermore, as the first assistance information 1209 is information for assisting generation of the same first encryption information 1208, the security of the first face information 1204 may be maintained even when the first ticket 1206 is leaked to a third person. In other words, security of biometric information may be maintained without using the infrastructure established for the security of biometric information.

Figure 13:
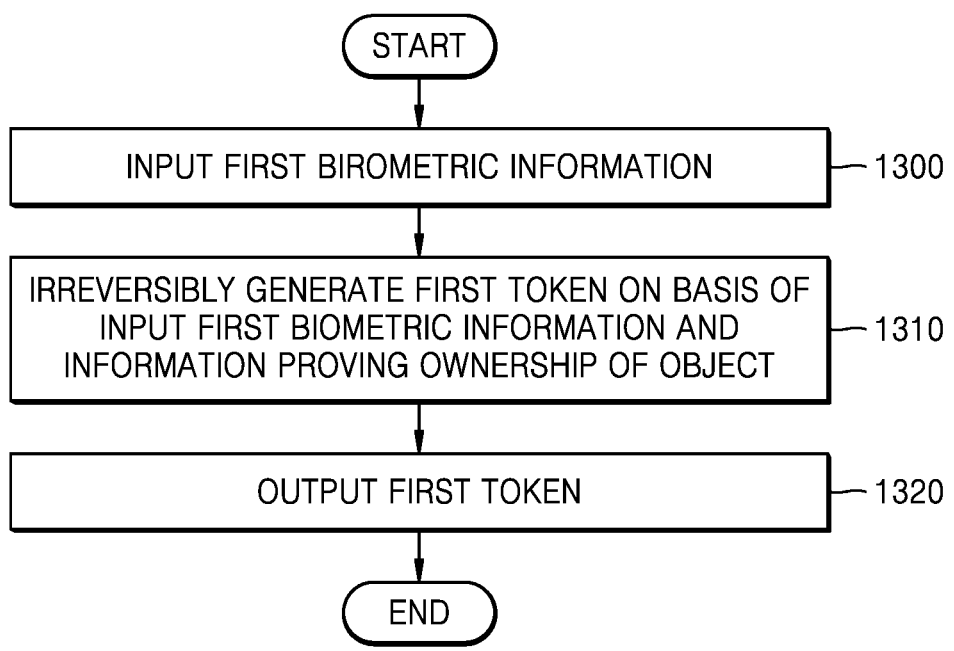
FIG. 13 is a flowchart of an operation according to an embodiment of the disclosure.

FIG. 13 is a flowchart of an operation according to an embodiment of the disclosure. In FIG. 13, any redundant configuration to that of FIG. 2 is briefly described.

Referring to FIG. 13, in operation 1300, the electronic device 100 receives first biometric information. In another embodiment of the disclosure, the first biometric information may include pieces of biometric information. The pieces of biometric information may be biometric information of a plurality of persons or different types of biometric information of the same person.

In operation 1310, the electronic device 100 irreversibly generates a first token based on first biometric information that is input and information proving the ownership of an object. The first token may include first encryption information, first assistance information, and information proving the ownership of an object. The electronic device 100 may generate first encryption information and first assistance information by applying a fuzzy extractor to the first biometric information and the information proving the ownership of an object.

In operation 1320, the electronic device 100 outputs a first token. In another embodiment of the disclosure, the electronic device 100 may output information about the generation of a first token, for example, information about a success/failure of the generation of a first token.

Figure 14:
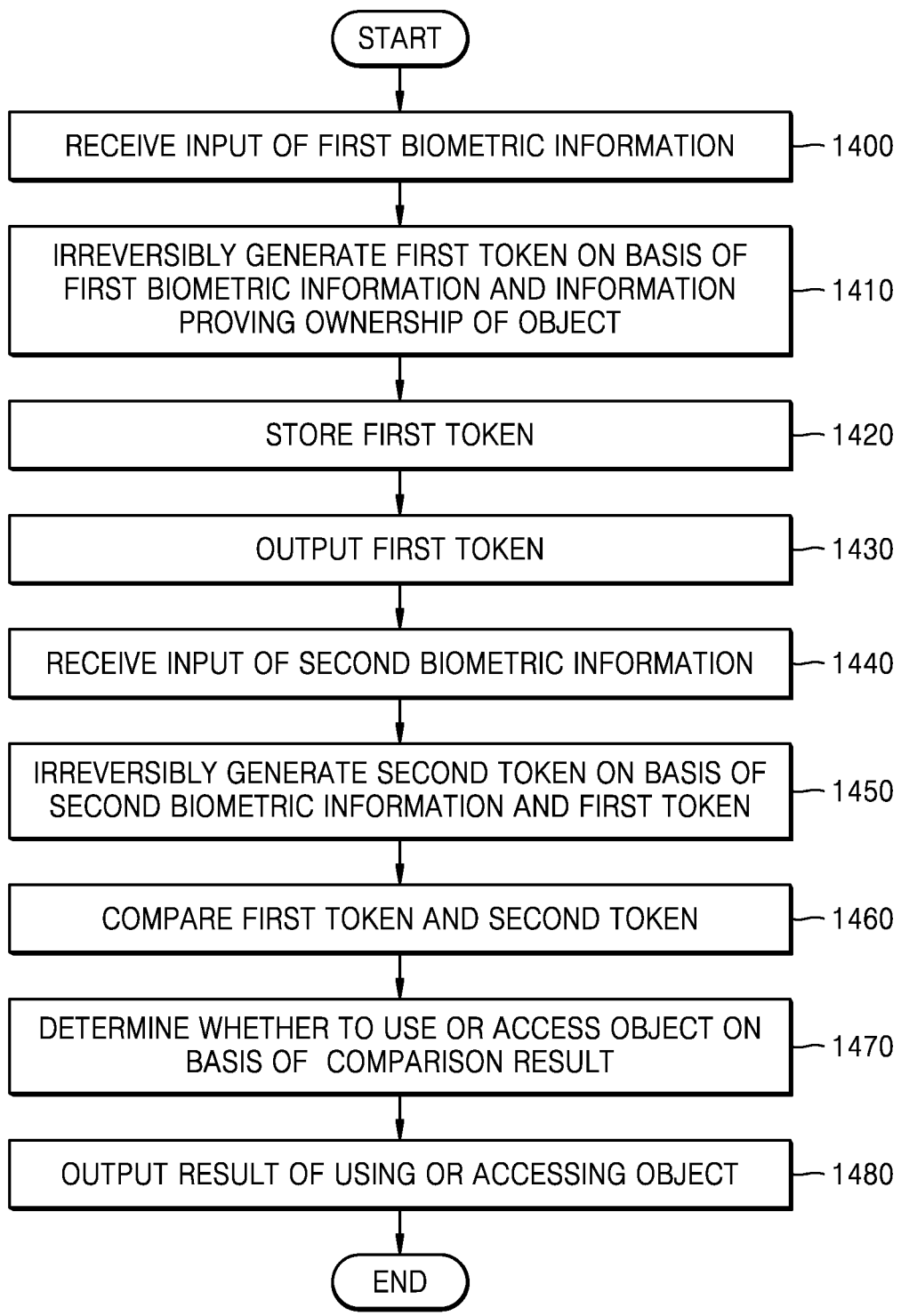
FIG. 14 is a flowchart illustrating operations according to an embodiment of the disclosure.

FIG. 14 is a flowchart illustrating operations according to an embodiment of the disclosure. In other words, as FIG. 14 illustrates operations to help the understanding of the disclosure, even when any operation is not included in the detailed operations, the operation still belongs to the scope of rights of the disclosure. In FIG. 14, any redundant configuration to that of FIG. 10 is briefly described.

Referring to FIG. 14, in operation 1400, the electronic device 100 may receive an input of first biometric information.

In operation 1410, the electronic device 100 irreversibly generates a first token based on first biometric information and information proving the ownership of an object. The first token may include first encryption information, first assistance information, and information proving the ownership of an object.

In operation 1420, the electronic device 100 stores the first token. In another embodiment of the disclosure, the electronic device 100 may transmit the first token to an external server.

In operation 1430, the electronic device 100 outputs the first token. In another embodiment of the disclosure, the electronic device 100 may output information about generation of a first token, for example, first information about a success/failure of the generation of a token.

In operation 1440, the electronic device 100 receives an input of second biometric information.

In operation 1450, the electronic device 100 irreversibly generates a second token based on second biometric information and the first token. In another embodiment of the disclosure, the second token may include only second encryption information.

In operation 1460, the electronic device 100 compares the first token with the second token. In another embodiment of the disclosure, the electronic device 100 may compare the first encryption information and the second encryption information.

In operation 1470, the electronic device 100 determines whether to use or access of an object based on a comparison result of the first token 1030 and the second token. For example, there may be a case in which the first token and the second token are the same so that a use or an access of an object is possible, and a case in which the first token and the second token are not the same so that a use or an access of an object is impossible. In another embodiment of the disclosure, the electronic device 100 may determine that a use or an access of an object is possible when the first encryption information and the second encryption information are the same.

In operation 1480, the electronic device 100 outputs an object use or access result. For example, a result of using or accessing a hotel accommodation service result may be output as a digital key.

Figure 15:
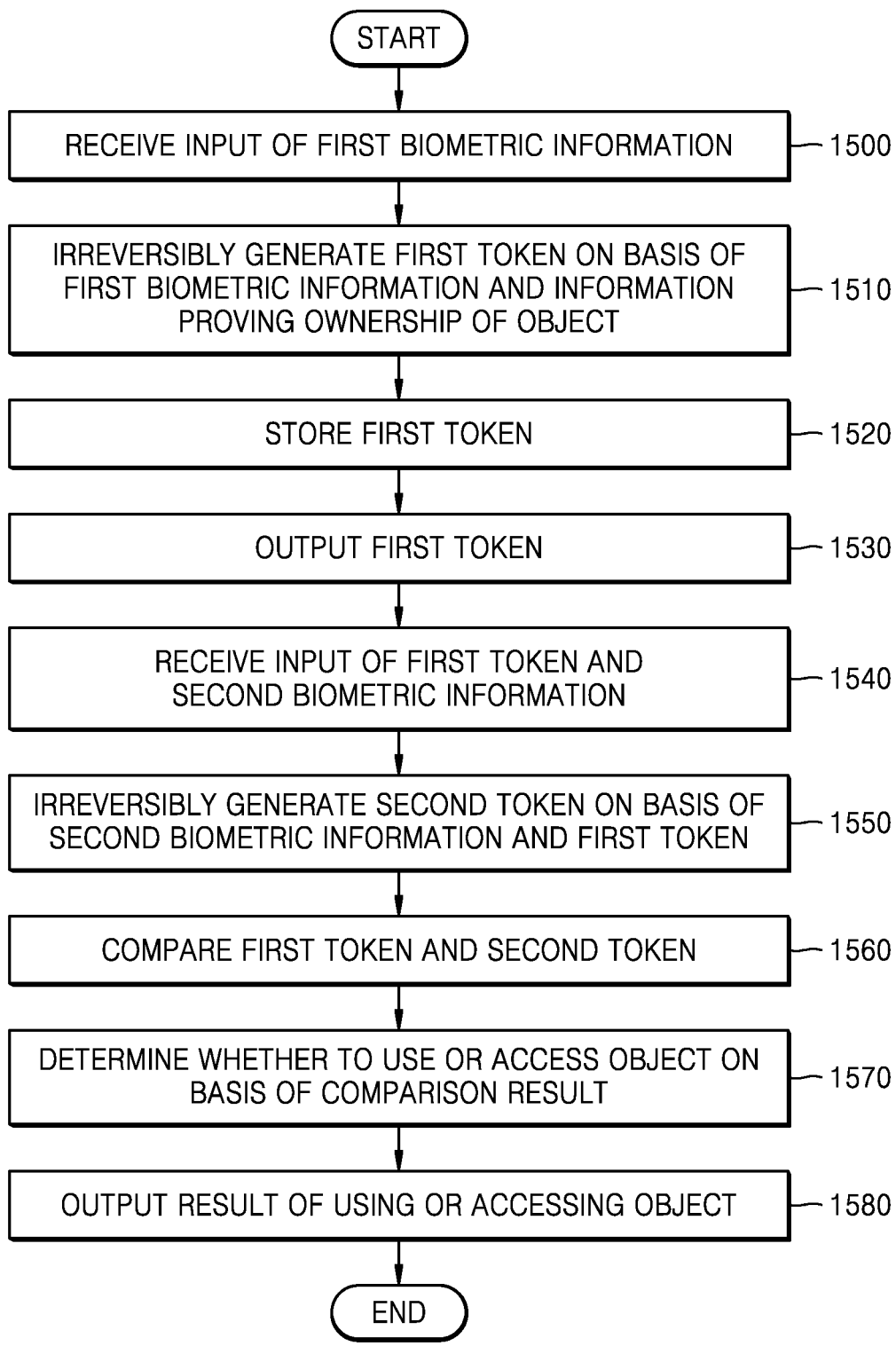
FIG. 15 is a flowchart illustrating operations according to an embodiment of the disclosure.

FIG. 15 is a flowchart illustrating operations according to an embodiment of the disclosure. In other words, as FIG. 15 shows detailed operations to help the understanding of the disclosure, even when any operation is not included in the detailed operations, the operation still belongs to the scope of rights of the disclosure. In FIG. 15, redundant configurations to those of FIGS. 10 and 12 are briefly described.

Referring to FIG. 15, in operation 1500, the first electronic device 1200 receives an input of first biometric information, for example, first face information. In operation 1510, the first electronic device 1200 irreversibly generates a first token based on first biometric information and information proving the ownership of an object, for example, concert viewing service purchase history information. The first token, for example, a first ticket, may include first encryption information, first assistance information, and concert viewing service purchase history information.

In operation 1520, the first electronic device 1200 stores the first token. In another embodiment of the disclosure, the electronic device 100 may transmit the first token to an external server.

In operation 1530, the first electronic device 1200 may output the first token. In another embodiment of the disclosure, the first electronic device 1200 may output information about generation of a first token, for example, first information about a success/failure of the generation of a token.

In operation 1540, the second electronic device 1220 receives an input of the first token and second biometric information, for example, second face information. In another embodiment of the disclosure, the second electronic device 1220 may receive the first token from the first electronic device 1200 through communication interface.

In operation 1550, the second electronic device 1220 irreversibly generates a second token based on the second biometric information and the first token. In another embodiment of the disclosure, the second token may include only the second encryption information.

In operation 1560, the second electronic device 1220 compares the first token with the second token. In another embodiment of the disclosure, the second electronic device 1220 may compare first encryption information with second encryption information.

In operation 1570, the second electronic device 1220 determines whether to use or access an object based on a comparison result of the first token and the second token. For example, there may be a case in which the first token and the second token are the same so that a use or an access of an object is possible, and a case in which the first token and the second token are not the same so that a use or an access of an object is impossible. In another embodiment of the disclosure, the second electronic device 1220 may determine that a use or an access of an object is possible when the first encryption information and the second encryption information are the same.

In operation 1580, the second electronic device 1220 outputs a result of using or accessing the object. In another embodiment of the disclosure, the second electronic device 1220 may transmit the result of using or accessing the object to the external server. For example, the second electronic device 1220 may transmit a result of using a concert viewing service to the external server to manage the concert viewing service, for example, to prevent reuse of a concert ticket.

The embodiments of the disclosure may be implemented as a software (S/W) program that includes instructions stored on computer-readable storage media. Furthermore, the embodiments of the disclosure may be implemented as a computer-readable storage medium storing a computer program.

A computer is a device capable of calling a stored instruction from a storage medium and operating according to the embodiment of the disclosure according to the called instruction, and may include an electronic device according to the embodiment of the disclosure.

A device-readable storage medium may be provided in the form of a non-transitory storage medium. The term "non-transitory storage medium" means a tangible device and does not include a signal, e.g., an electromagnetic wave, and this term does not distinguish between the case where data is stored semi-permanently and temporarily. For example, the "non-transitory storage medium" may include a buffer where data is temporarily stored.

Furthermore, the electronic device and the method of operation according to the embodiments of the disclosure may be provided by being included in a computer program product. The computer program products are products that can be traded between sellers and buyers.

The computer program products may be distributed in the form of a S/W program, a computer-readable storage medium where the S/W program is stored, and a computer-readable storage medium, e.g., a compact disc read only memory (CD-ROM), through an application store, e.g., PlayStore™, or directly between two user devices, e.g., smartphones, or online, e.g., download or upload. In the case of online distribution, at least part of a computer program product, e.g., a downloadable application, may be at least temporarily stored or temporarily created on a storage medium readable by a device, such as a manufacturer's server, an application store server, or a relay server memory.

A computer program product may include a storage medium of a server or a storage medium of a terminal in a system including a server and a terminal, e.g., an electronic device, a portable electronic device, a wearable device, etc. Alternatively, when there is a third device, e.g., a smartphone, that communicates with a server or a terminal, the computer program product may include a storage medium of the third device. Alternatively, the computer program product may be transmitted from the server to the terminal or the third device, or may include a S/W program that is transmitted from the third device to the terminal.

In this case, server, one of the terminal and the third device may perform a method according to the embodiments of the disclosure by executing the computer program product. Alternatively, as two or more of the server, the terminal, and the third device execute the computer program product, the method according to the embodiments of the disclosure may be performed in a distributed fashion.

For example, a server, for example, a cloud server or an artificial intelligence server, etc., may execute a computer program product stored in the server to control the terminal communicatively connected to the server to perform the method according to the embodiments of the disclosure.

In another example, the third device may execute a computer program product to control the terminal communicatively connected to the third device to perform the method according to the embodiment of the disclosure. For example, the third device may remotely control the electronic device to perform a method of controlling the electronic device.

When the third device executes the computer program product, the third device may download the computer program product from the server, and execute a downloaded computer program product. Alternatively, the third device may execute a computer program product provided in a preloaded state to perform the method according to the embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    an input/output interface; and
    at least one processor configured to:
        irreversibly generate a first token to use or access an object based on first biometric information of a user input through the input/output interface and information proving ownership of the object,
        output the first token through the input/output interface,
        irreversibly generate a second token to use or access the object based on second biometric information of the user that is input through the input/output interface and the first token,
        compare the first token with the second token, and
        output, through the input/output interface, a result of using or accessing the object, based on the comparison result.

2. The electronic device of claim 1, wherein the first biometric information that is input comprises a plurality of types of biometric information.

3. The electronic device of claim 1,
    wherein the first biometric information comprises biometric information of a plurality of persons, and
    wherein the information proving the ownership of the object comprises information that proves ownerships of the plurality of persons.

4. The electronic device of claim 1, wherein the first token comprises:
    encryption information randomly generated from a combination of the first biometric information and the information proving the ownership of the object; and
    assistance information for assisting generation of same encryption information as the encryption information.

5. The electronic device of claim 4, wherein the first token comprises the information proving the ownership of the object.

6. The electronic device of claim 1, wherein the outputting of the first token through the input/output interface comprises outputting information about generation of the first token.

7. A method of controlling an electronic device, the method comprising:
    irreversibly generating a first token to use or access an object based on first biometric information of a user that is input and information proving ownership of the object;
    outputting the first token;
    irreversibly generating a second token to use or access the object based on second biometric information of the user that is input through an input/output interface and the first token;
    comparing the first token with the second token; and
    outputting, through the input/output interface, a result of using or accessing the object, based on the comparison result.

8. The method of claim 7, wherein the first biometric information that is input comprises a plurality of types of biometric information.

9. The method of claim 7,
    wherein the first biometric information comprises biometric information of a plurality of persons, and
    wherein the information proving the ownership of the object comprises ownerships of the plurality of persons.

10. The method of claim 7, wherein the first token comprises:
    encryption information randomly generated from a combination of the first biometric information and the information proving the ownership of the object; and
    assistance information for assisting generation of same encryption information as the encryption information.

11. The method of claim 10, wherein the first token comprises the information proving the ownership of the object.

12. The method of claim 7, wherein the outputting of the first token comprises outputting information about generation of the first token.

13. A method of controlling an electronic device, the method comprising:
- receiving an input of a first token irreversibly generated to use or access an object based on first biometric information of a user and information proving ownership of the object;
- irreversibly generating a second token to use or access the object based on a second biometric information of the user and the first token;
- comparing the first token with the second token; and
- outputting a result of using or accessing the object based on the comparison result.

14. The method of claim 13, wherein the receiving of the input of the first token comprises receiving the first token through communication interface.

15. A non-transitory computer program product comprising a recording medium storing a program for executing a method comprising:
- irreversibly generating a first token to use or access an object based on first biometric information of a user that is input and information proving ownership of the object;
- outputting the first token;
- irreversibly generating a second token to use or access the object based on second biometric information of the user that is input through an input/output interface and the first token;
- comparing the first token with the second token; and
- outputting, through the input/output interface, a result of using or accessing the object, based on the comparison result.

* * * * *